United States Patent [19]
Cahill

[11] Patent Number: 5,133,624
[45] Date of Patent: Jul. 28, 1992

[54] METHOD AND APPARATUS FOR HYDRAULIC EMBEDMENT OF WASTE IN SUBTERRANEAN FORMATIONS

[76] Inventor: Calvin D. Cahill, 14505 W.C.R. 3, Longmont, Colo. 80504

[21] Appl. No.: 603,881

[22] Filed: Oct. 25, 1990

[51] Int. Cl.$^5$ .............................................. B09B 3/00
[52] U.S. Cl. ................................... 405/128; 166/308; 405/129
[58] Field of Search ............... 405/128, 129, 269, 267, 405/266; 166/305 D, 308, 281, 295

[56] References Cited

U.S. PATENT DOCUMENTS

| | | | |
|---|---|---|---|
| 2,880,587 | 4/1959 | Hendrix et al. | |
| 3,064,957 | 11/1962 | Jacoby | |
| 3,070,162 | 12/1962 | Barnard | 405/128 X |
| 3,108,439 | 10/1963 | Reynolds et al. | 166/305 D |
| 3,110,557 | 11/1963 | Spector | 405/128 X |
| 3,196,619 | 7/1965 | Shock | 166/305 D |
| 3,292,693 | 12/1966 | Hill et al. | 166/305 D |
| 3,318,380 | 5/1967 | Tenny | 166/305 D |
| 3,331,206 | 7/1967 | Osborne | |
| 3,374,633 | 3/1968 | Brandt | |
| 3,513,100 | 5/1970 | Stogner | 166/305 D X |
| 3,526,279 | 9/1970 | Colburn | 166/305 D X |
| 3,722,593 | 3/1973 | Poettmann | 405/128 |
| 3,841,102 | 10/1974 | Cinner et al. | 405/128 |
| 3,854,533 | 12/1974 | Gurley et al. | |
| 4,072,194 | 2/1978 | Cole et al. | |

Primary Examiner—Dennis L. Taylor
Attorney, Agent, or Firm—Kirkland & Ellis

[57] ABSTRACT

There is disclosed a method and apparatus for waste disposal by hydraulic embedment in a subterranean formation. A method in accordance with the present invention comprises the steps of drilling into stable geologic formations thousands of feet below ground, fracturing those formations, pumping a mixture of hazardous waste in solid, liquid, or sludge form and a selected transport medium into the fractured formations, and preventing migration of the waste. Although a suitable transport medium can be selected based on a number of factors, transport media selected in accordance with one aspect of the present invention prevent migration of the waste by reacting chemically or to either heat or pressure or both to become highly viscous or solid. In other aspects of the present invention, the method prevents waste migration by either pumping a fluid for sealing the fractured underground formation before the mixture is pumped or encapsulating the waste prior to mixture with the transport medium and injection into the fractured formation. Apparatus for carrying out the method is also disclosed.

20 Claims, 12 Drawing Sheets

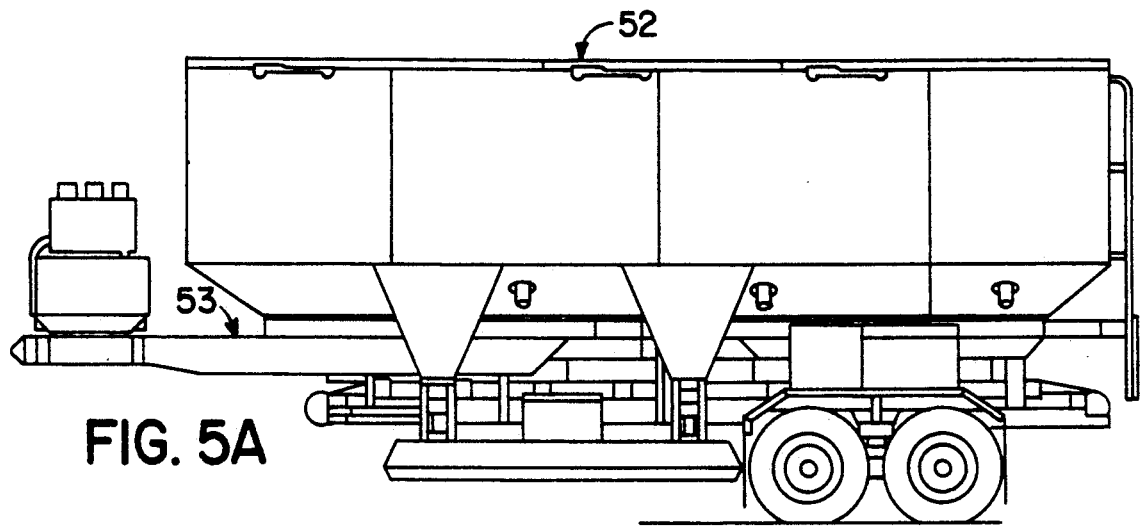
FIG. 5A
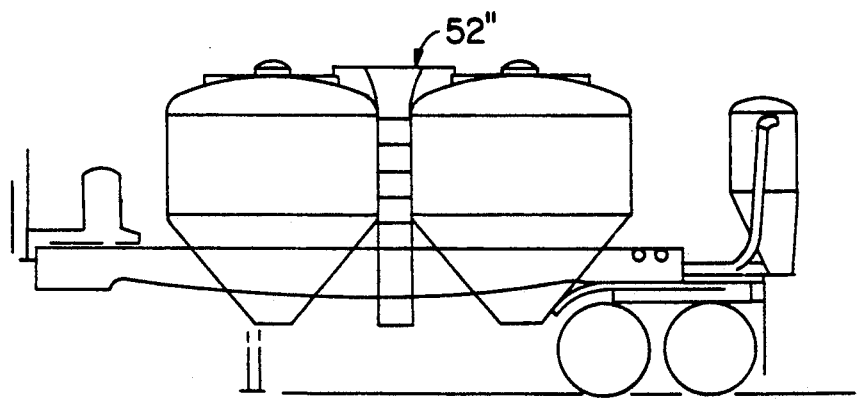
FIG. 5C-a
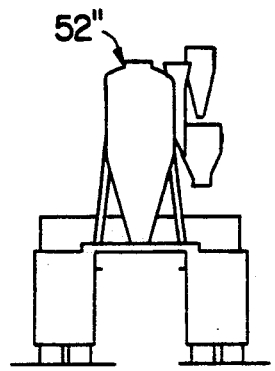
FIG. 5C-b

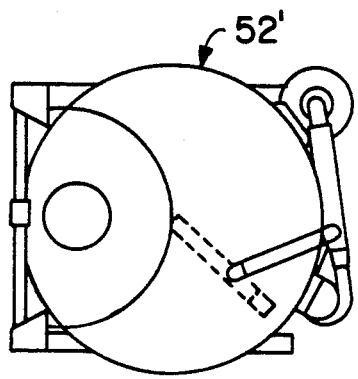
FIG. 5B-a
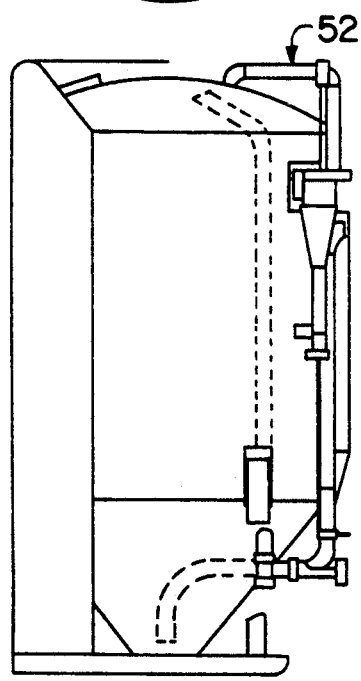
FIG. 5B-b
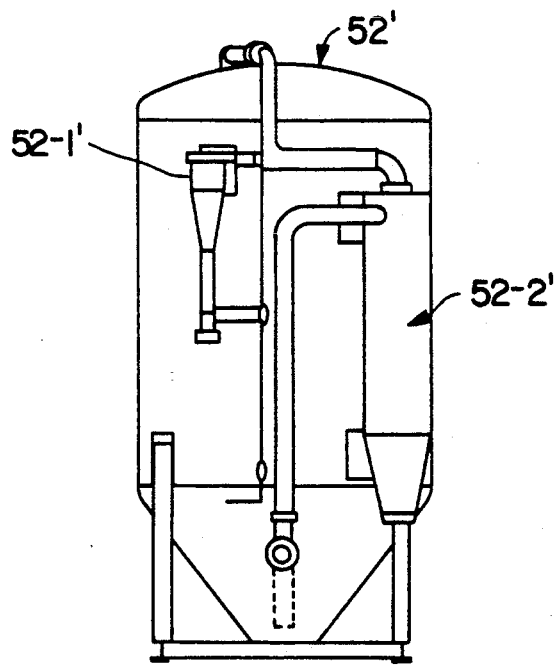
FIG. 5B-c

FIG. 7A
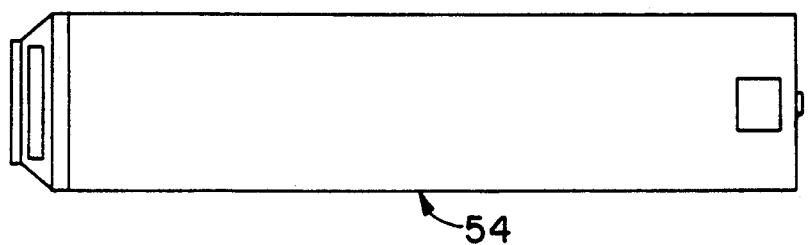
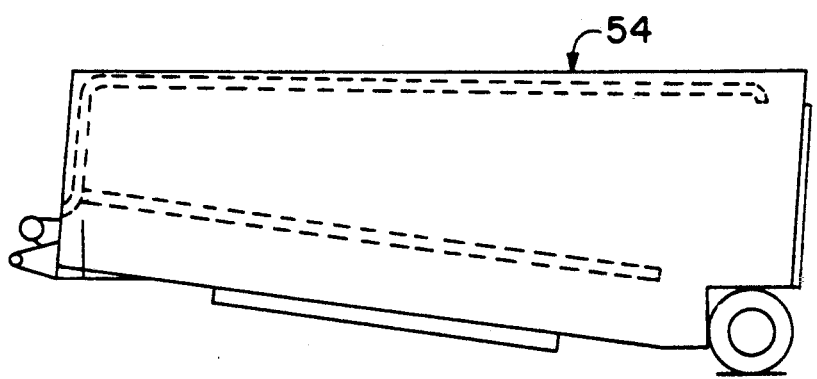
FIG. 7B

METHOD AND APPARATUS FOR HYDRAULIC EMBEDMENT OF WASTE IN SUBTERRANEAN FORMATIONS

BACKGROUND

The present invention relates to methods and apparatus for disposing of wastes, including and particularly to such methods and apparatus for waste disposal in underground formations.

With passage of the Resource Conservation and Recovery Act ("RCRA") in 1976, Congress envisioned the development of a regulatory program that would control "hazardous waste" from the "cradle"—the point of generation—to the "grave"—the point of ultimate disposal. RCRA defined the term "hazardous waste" as including any solid waste that, because of its quantity, concentration, or physical characteristics, may cause or significantly contribute to an increase in mortality or an increase in serious irreversible or incapacitating, reversible illness, or pose a substantial present or potential hazard to human health or the environment when improperly managed. Despite certain exceptions and later amendments, a broad definition of hazardous waste remains in RCRA. The term "toxic waste" is often defined somewhat differently, usually being applied to materials that cause immediate prolonged loss of normal body functions or death. In the present application, the terms "waste" and "hazardous waste" will be understood to include hazardous waste as defined in RCRA, as well as any toxic, radioactive, or other waste.

At present, there are four accepted approaches to the problem of hazardous waste: (1) source reduction, (2) recycling, (3) incineration, and (4) residual management. Source reduction imposes extensive regulatory constraints on generators of hazardous waste, thereby restricting progress in advanced consumer products such as television, telephones, energy, cars, plastics, etc. Significant progress in source reduction will come only from world-wide acceptance of such restrictions. Recycling involves "cleaning" and separating waste so that some of the waste constituents can be reused, often by their generator. While recycling reduces the waste volume, some residue of sludges and solids usually remains for disposal. Incineration requires modern combustion equipment coupled with proper air-emissions-control equipment. Although incineration can significantly reduce waste volume, it produces increased air emissions and an ash residue, which can be hazardous themselves.

Residual management is a modern version of land filling in which a "coffin" for the waste is carefully designed to control air emissions and soil and ground water contamination from leachate. The coffin is typically prepared by excavating from the surface to a stable area and backfilling with alternating layers of impermeable clay and waste; rubber or plastic liners are sometimes placed down before the first clay layer. After the coffin is filled, a final layer of clay permanently seals the coffin and wastes against water infiltration. Although much more acceptable than conventional landfilling, residual management produces some unavoidable air emissions, and because coffins typically reach depths of only about 60 feet and lie above aquifers, contamination can occur that is very difficult to repair.

U.S. Pat. Nos. 3,108,439 to Reynolds et al.; 3,331,206 to Osborne; 3,335,798 to Querio et al.; 3,374,633 to Brandt; and 3,513,100 to Stogner disclose another storage method involving cable tool or rotary drilling into suitable subterranean formations and pumping material, e.g., radioactive liquids or slurries, waste solids or sludges, or other liquids or gasses, into the formations. General aspects of well drilling are disclosed in the above-listed U.S. Patents and in U.S. Pat. Nos. 2,880,587 to Hendrix et al. and 3,064,957 to Jacoby. As described in the Stogner patent for example, a mixture of sharply angular solid waste particles and an aqueous cement are used to fracture and prop open an underground formation. Any incompressible fluid, like cement, can be used as a fracturing inducing fluid, but as described below, not all fracturing inducing fluids are suitable for permanent waste disposal.

Cement is a generic term representing many compositions and consistencies, but on average, pumpable cement has a viscosity between 20 and 30 centipoise. Such low viscosity is in marked contrast to the transport fluids described in more detail below, that develop viscosities as high as several hundred centipoise. This difference is one factor accounting for the large volumes of waste able to be handled by the present invention. In a static state, cement might hold as much as 2 pounds of radioactive solid waste per gallon if the waste were highly pulverized; as described further below, crosslinked hydroxypropel guars, on the other hand, can hold 9 to 12 pounds per gallon and as much as 20 pounds or more per gallon down hole.

In addition, the concentration of waste able to be transported by cement and other low viscosity fluids is highly dependent on the flow rate. At low pump rates cement would carry only low concentrations of waste; at high pump rates, fluid velocity and turbulence would permit higher concentrations of waste to be transported. Thus, when used in waste disposal, cement would let the transported waste settle out whenever pumping was interrupted or the fluid flow velocity decreased. As described further below, such a velocity decrease would typically occur when the fluid leaves the well and begins to enter the subterranean formation. Moreover, after a waste-cement mixture was injected into an underground formation, the waste would settle to the bottom of the fracture with little or no cement surrounding it. Such settling is particularly likely to occur for a radioactive waste such as uranium due to its high specific gravity.

Cement is also incompatible with certain wastes and has other undesirable properties. For example, cement eventually breaks down during prolonged exposure to nuclear radiation. Even for non-nuclear wastes, its permeability (typically about 50 millidarcys) would be much greater than a suitable waste disposal formation's permeability (about 0.1 millidarcy). Thus, cement would be unsuitable as a waste transport fluid because it would provide a leakage path through the formation instead of a permanent seal.

There are other significant differences between waste disposal in accordance with the present invention and typical oil and gas exploration practices. Conventional oilfield stimulation intentionally increases a formation's permeability, thereby permitting fluid transport to the well bore. A temporarily viscous transport fluid is used to fracture the formation and inject a proppant to keep the formation open, but such transport fluids are intended to break down to a very low viscosity and be removed from the well bore, thereby producing the minimum possible damage to the formation. Also, stimulation normally uses proppants that are very hard, well rounded substances, such as polished sand, to keep the fracture open and provide the highest possible fluid permeability in the formation. Such sand has a typical specific gravity of about 3, which is much lower than the specific gravity of about 18 of some radioactive wastes, and the low viscosity transport fluids used in conventional oilfield stimulation suffer from most of the same drawbacks for waste disposal as cement.

In contrast to conventional oilfield stimulation, the present invention advantageously provides for placement of hazardous wastes in a totally isolated environment with no chance of migration. In one aspect, the invention employs an incompressible, viscous transport fluid to fracture a selected underground formation, convey the waste underground, retain its viscosity or even harden with time in the formation, and have low to no permeability. A proppant would not be used to hold the formation open; the pressure of the waste-bearing transport fluid would keep the formation open during waste disposal. Thus, when the pressure was removed, the waste transported into the formation would be embedded therein due to its relative softness as the formation closed. Among the many advantages provided by the present invention is the expected much lower exposure to RCRA liability due to the known and controlled conditions of waste disposal sites in accordance with the present invention.

SUMMARY

The present invention provides a better solution to the problem of waste disposal: hydraulic embedment. A method in accordance with the present invention comprises the steps of drilling into stable geologic formations thousands of feet below ground, fracturing those formations, pumping a mixture of waste in solid, liquid, and/or sludge form and a selected transport fluid into the fractured formations, and preventing migration of the waste. Although a suitable transport fluid can be selected based on a number of factors, transport fluids selected in accordance with one aspect of the present invention prevent migration of the waste by reacting under either heat or pressure or both to become highly viscous or solid. In other aspects of the present invention, the method prevents waste migration by either pumping a prepad fluid for sealing the fractured underground formation before the waste-transport mixture is pumped or encapsulating the waste prior to mixture with the transport fluid and injection into the fractured formation.

Hydraulic embedment in accordance with the present invention places hazardous waste in a permanently isolated environment unlike any other type of disposal process. The invention permits the safe, permanent disposal of hazardous, toxic, radioactive, and other wastes by permanently embedding the substances deep underground. The invention can deal with most forms of waste, including solids, liquids, and sludges, and virtually all hazardous and toxic waste groups as defined by RCRA.

BRIEF DESCRIPTION OF THE DRAWINGS

The features and advantages of the present invention will be understood by reading the following detailed description in conjunction with the drawings in which:

FIG. 5A is a schematic diagram of a trailer-bulk storage system;

FIGS. 5Ba, 5Bb, and 5Bc are orthogonal views of a pneumatic vertical storage bin;

FIGS. 5Ca and 5Cb are orthogonal views of a pneumatic trailer storage bin;

FIGS. 7A, and 7B are orthogonal views of a 500-barrel liquid storage trailer;

DETAILED DESCRIPTION

Figure 1:
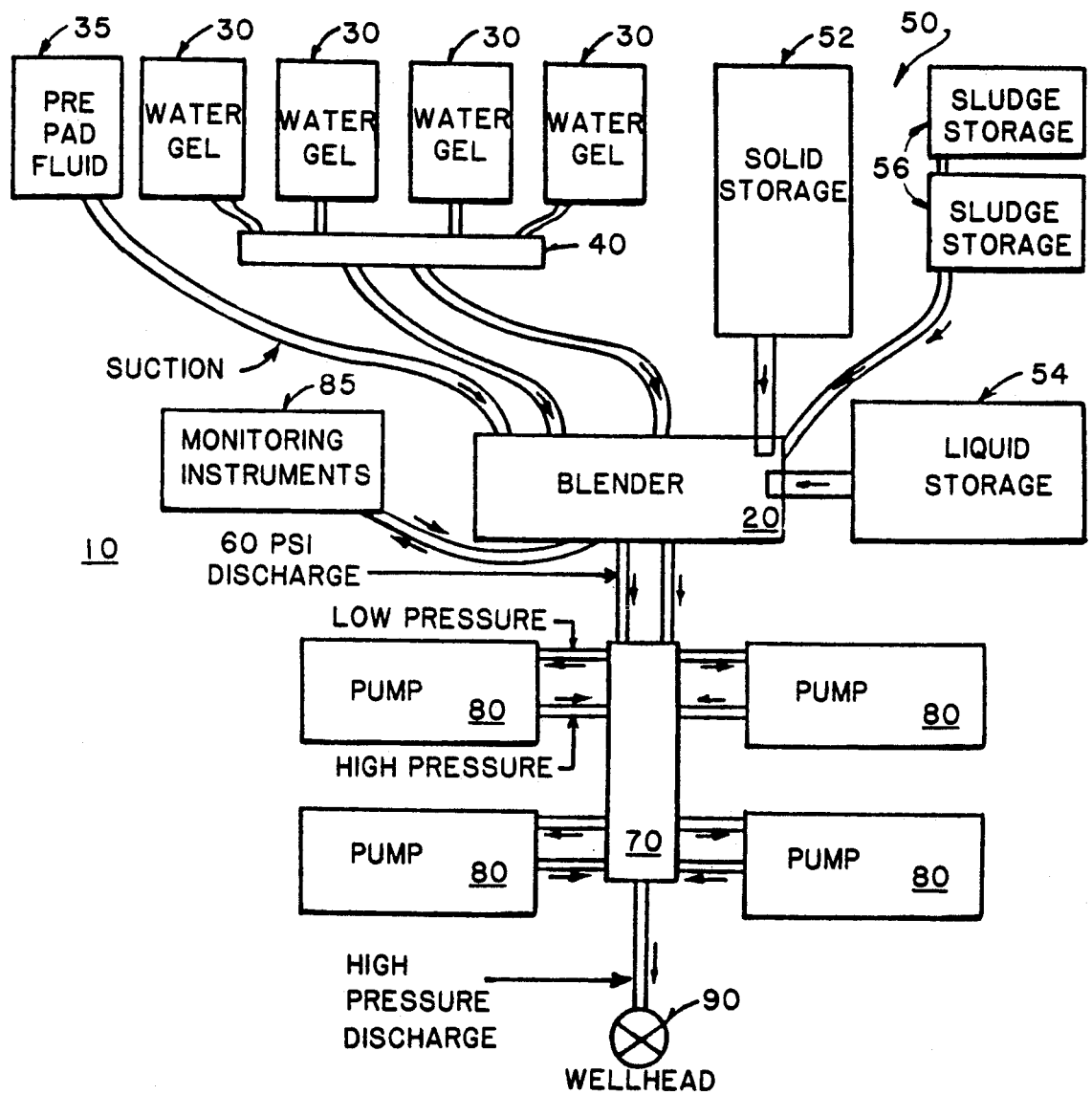
FIG. 1 is a block diagram of preferred surface equipment for the present, embedment process.

During the 1930's and 40's, it was common in oil and gas exploration to drill into subterranean formations that contained oil and gas but that produced at uneconomically low flow rates. A method for increasing such low flow rates was developed by J. B. Clark in 1948. The method, called "fracturing", was based on the observation that pressure applied at the wellhead to an incompressible fluid could be transmitted downhole to the exposed formation, which would part under the transmitted stress.

In accordance with one aspect of the present invention, a subterranean formation is fractured, creating a reservoir deep underground into which waste can be transported safely and stored permanently in a completely isolated environment. The features of the present invention will be described in more detail below in connection with the following categories: (1) site selection; (2) waste preparation; (3) transport fluid selection; (4) surface equipment; (5) well drilling; and (6) waste embedment.

Site Selection

Bite selection for the present hydraulic embedment process is based on well known subsurface and surface criteria and related factors. In general, geologically explored sedimentary basins are preferable because the geologic information typically gathered during conventional oil and gas exploration yields the subsurface data useful in the selection of acceptable formations for the present process.

The important subsurface considerations in selecting a site for carrying out the present invention are the following: (1) the area should be reasonably free of tectonic activity; (2) the area should not contain major faulting or other geologic conditions that could produce leakage paths or other effects that would be unfavorable for permanent waste disposal; (3) if the site selected is an area of active oil and gas exploration or near abandoned wells, well known competent plugging techniques should be used in drilling the waste disposal well or wells to ensure their isolation from the other wells; and (4) the area would preferably not be near existing water wells or in an area where actively used aquifers are deeper than 2,000 feet. (It will be appreciated that aquifers deeper than 2,000 feet are usually too saline for most uses.) Also, it is preferable that the basin selected contain a thick sedimentary column, preferably in excess of 10,000 feet. In accordance with the present invention, waste will typically be embedded at depths greater than about 5,000 feet to help insure permanent disposal. It is believed that the most favorable types of formations for the present hydraulic embedment process are shales and low permeability sandstones, limestones, and dolomites.

As for the surface criteria relevant to waste disposal site selection, it is preferred that the site meet many of the requirements imposed in the permitting of a Hazardous Waste Treatment Storage or Disposal facility ("TSD") under RCRA to facilitate the implementation of the present method. Similarly, the site should meet the requirements for facility management and operation listed in the Standards for Owners and Operators of Hazardous Waste Treatment, Storage and Disposal Facilities set forth at 40 C.F.R. §264 promulgated under RCRA. The regulations, which are incorporated herein by reference, prescribe actions of the owner and operator of a TSD in regard to general facilities standards, preparedness and prevention, contingency plan and emergency procedures, manifest system, record-keeping, reporting, groundwater protection, container use and management, tanks, surface impoundments, and waste piles.

Although all such government regulations would not be applicable to waste disposal in accordance with the present invention, other desirable surface conditions for the site selected for carrying out the present method are as follows: (1) the site should be located away from densely populated, urban areas; (2) the site and individual disposal wells should be secure from physical intrusion; (3) the site should be separated from sources of ignition; (4) the site should be located away from floodplains or landsurface water; (5) access roads should avoid densely populated areas or crossing surface water to the extent practical; and (6) the site should be able to contain possible runoff or spills.

Based on the foregoing subsurface and surface considerations, it is expected that a large number of acceptable embedment sites would be identified. For example, potentially acceptable embedment sites are abandoned offshore drilling platforms. In typical oil and gas offshore development, a platform is constructed from which many wells are directionally drilled. At the end of its production of hydrocarbons, such a platform could be re-equipped to allow the existing wells to be used in accordance with the present invention.

Waste Preparation

The present invention provides for dealing with many different types of wastes and the varying forms in which they exist, although it appears that high-BTU volatile materials, such as organic solvents and strong oxidizers, have characteristics that could pose special conditions on their disposal by the present method.

In general, waste from different sources would be prepared initially by screening the various waste components for mutual compatibility. The main compatibility consideration is the well known tendency of certain chemicals to have strong exothermic reactions when combined. Such reactions should be avoided or controlled, e.g., by permitting such reaction to occur under controlled conditions. After the wastes' reactive compatibility has been determined, the wastes would advantageously be separated into consistency-based groups, e.g., solids, sludges, and liquids.

For disposal in accordance with the present invention, solid wastes, which are the preferred form for handling hazardous wastes, would preferably vary in particle size from about 100 mesh (smaller) to about 10 mesh (larger). The preferred range of particle sizes could be established by passage through a sieve screen, and depending on the wastes' original size, the particle size could be reduced or increased. Particle size reduction can be achieved through conventional grinding or crushing processes; particle size increase can be achieved through agglomeration, such as through the application of heat or pressure or the addition of binding agents. Any material that could be added to the waste to assist in producing stronger or more durable agglomerates would be a suitable binder.

It will be appreciated that limiting the largest particle size to about 10 mesh would advantageously limit the wear of the pumps and other equipment described below, which are typically designed for handling liquids, as well as avoid potential bridging within the formation. As for the smaller size particles, conventional sieving machinery begins to increase in cost for finer meshes, and smaller particles are harder to handle and are more likely to pose dust control and emission problems at the disposal well site.

The result of the foregoing waste preparation would be waste particles having preferably angular shapes and a range of sizes that will thus produce a subterranean mass having very low fluid permeability. As described above, such angularity is not normally used in fractured-formation drilling, which normally seeks to increase the permeability of underground formations. Also, the range of sizes provides denser particle packing in the underground formation and consequent lower permeability, which would contribute to the waste's permanent immobilization.

In one aspect of the invention, the particulate solid waste would be stabilized, or isolated, through a microencapsulation process that would insure pumpability or isolation underground. After the waste has been physically processed to a suitable particle size, if necessary, the particles would be coated with polymers or resins that resist deterioration either during pumping or storage underground. Thus, the waste would be permanently isolated from the transport fluid, e.g., for compatibility reasons, and even from the subterranean formation. Suitable coating agents would be polycarbonates, modified polybutadene, polyethylenes, isopolyesters, epoxies, or resins, although it will be appreciated that other materials can also be suitable.

An epoxy resin that is resistant to degradation by liquid waste is described in U.S. Pat. No. 4,072,194 to Cole et al., which is incorporated herein by reference. Other uses of epoxies to increase, rather than decrease, subterranean permeability are described in U.S. Pat. No. 3,854,533 to Gurley et al. As described elsewhere herein, the above-listed coating agents can also be used for precoating the fractured subterranean formation. It will be noted that epoxies today are relatively more expensive and could be too hard, i.e., they could be pulverized when the formation closes after removal of fluid pressure and produce a relatively high permeability path through the formation. Plastics may have optimal properties in that they are generally impermeable but not too hard.

As a prior example of the use of coating agents, a water-soluble polycarbonate has recently been used by others to coat a viscosity reducing agent, or breaker, that was then transported in an aqueous transport fluid. The thickness of the polycarbonate was selected such that it would dissolve only after reaching the fractured formation; thus, the breaker could be mixed with and be transported by the transport fluid and reduce the viscosity of the fluid in the formation, allowing more of the fluid to be removed from the fracture. In that way, a more productive formation was achieved, which is the goal of conventional oilfield fracturing. In a similar fashion in the present waste disposal method, one or both of the parts of a two-part epoxy could be coated with polycarbonate to delay the thickening or solidification of a waste-transport-fluid-epoxy mixture until it has reached the fractured formation.

It will be understood that the selection of the most appropriate coating agent for the micro-encapsulation process will be based on the type of waste to be coated, the temperature and pressure that the coating will be exposed to underground (which will typically range between 100° F. and 400° F. and 250 psi to 10,000 psi at the depths used for waste disposal), and the type of transport fluid chosen.

In preparing sludges for disposal, the main concern other than reactive compatibility is pumpability. As described further below, the viscosity of the waste-transport fluid mixture will be preferably about 25 centipoise while at the surface or top of the disposal well to avoid excessive friction losses during pumping underground. To assure adequate pumpability, the sludge would be given a substantially uniform consistency throughout by, for example, adding thickening or thinning agents, as appropriate. Suitable thickening agents could be concentrates of the selected transport fluid used in the embedment process. Suitable thinning agents could be virtually any sludge-compatible fluid, such as water or even other low-viscosity waste, that would yield a pumpable solution when blended with the sludge.

Liquid waste would require minimal preparation and would be mixed continuously with the transport fluid in concentrations appropriate to maintaining the desired viscosity as the waste-transport fluid mixture is pumped into the fractured formation. It will be understood that, as described above, suitable thickening or thinning agents, as appropriate, could be mixed with a liquid waste to obtain the proper viscosity. In addition, it will be appreciated that the compatibility of the liquid waste with the transport fluid could also affect the concentration added to the transport fluid. For example, the concentration of acid waste would typically be such as to avoid substantial negative effects due to the mixture's pH.

Once prepared as described above, the waste will typically be transported to holding reservoirs at the disposal well site until a sufficient quantity is accumulated for embedment. It will be appreciated that the foregoing waste preparation can also be carried out at the disposal site if desired.

Transport Fluid Selection

Transport fluids suitable for use in the present embedment process have viscosities low enough to allow a mixture of the transport fluid and waste to be pumped, but great enough to be able to carry waste particles in suspension. Viscosities for transporting solid waste particles are preferably about 25 centipoise. Also in one aspect of the invention, once the waste-transport fluid mixture is placed in a formation, it preferably maintains or increases its viscosity into the range from about 200 to 800 centipoise or even solidifies as a result of chemical reactions of its own constituents or constituents of the waste or subterranean formation or induced by subterranean temperature and pressure.

Suitable transport fluids that can be used in carrying out the present invention are aqueous solutions of polyacrylamides, hydroxethyl guar, hydroxethel cellulose, monomers, polycarbonates, and sodium silicates. Pozzolans, which are siliceous materials such as fly ash that react with lime to form cementitious materials, and even cement, although subject to many severe limitations as described above, might be useful in some cases.

Polyacrylamides, hydroxpropyl guars, and hydroxyethyl cellulose are long-chain-polymer materials that provide an advantageous time-delayed viscosity increase in one aspect of the present invention. In use, suitable quantities of these gelling agent materials would be mixed with water and waste to obtain a mixture having a viscosity of about 25 centipoise. For example, about 55 gallons of polyacrylamide in 200–1,000 barrels of water or about 200 pounds of hydroxypropel guars in about 500 barrels of water would produce a useful viscosity. A time-delay cross-linking agent would also be added to link the separate polymer chains, thereby increasing the viscosity of the mixture into the range of 200–800 centipose. Typical cross-linkers are highly positively charged ionic materials, e.g., metals such as titanium and zirconium, although iron and aluminum, as well as other more expensive materials, may also be suitable. Approximately 20 gallons of a titanium cross-linker would typically be mixed with 4,000–5,000 barrels of the mixture. As described further below, the action of the cross-linker would be timed to occur after the mixture has entered the underground formation. Thus, the likelihood of waste movement out of the formation would be greatly reduced.

In general, transport fluids would be selected for a given embedment application based on considerations of lowest cost and compatibility with the waste to be transported and the conditions downhole. For example, it is expected that for disposal of encapsulated waste, which would be substantially isolated from the transport fluid, the aqueous polymers would be selected due to their low cost. The waste itself may include suitable amounts of iron or other suitable material for acting as a cross-linker for a polymeric transport fluid further reducing cost. Monomers would likely be used when the waste to be embedded is a monomer, and such a monomeric transport fluid would include suitable materials to obtain and maintain a proper viscosity. In selecting a salt solution as a transport fluid, it would be necessary to consider its lesser strength in the formation and its higher heat sensitivity. Thus, salt would typically be used for wells deep enough to provide enough heat to drive off the water from the fluid and immobilize the waste, but not so deep that the heat would break down the salt and potentially permit waste migration.

It will be appreciated that other materials are also expected to be useful as transport fluids and would be selected for a particular disposal application in accordance with the foregoing considerations of mutual chemical compatibility; viscosity, etc., and the underground temperature and pressure. For example, higher viscosities would be used for transporting solids or sludges having higher specific gravities, such as heavy radioactive wastes, and fluids capable of withstanding higher temperatures without reduction in viscosity would be used at greater depths where temperature are expected to be higher.

In addition to a transport fluid, a prepad fluid may first be pumped into the disposal well during the embedment process. Preferred prepad fluids, such as polymers like polyethylene, polybutylene, modified polyesters, epoxies, or resins, would advantageously form a thin film on the exposed surface of the fractured formation and act as an impermeable barrier to the embedded waste, thereby sealing the formation before insertion of the waste. Such sealing would be particularly advantageous where micro-fracturing exists in the subterranean formation and would minimize contact between the embedded waste and fluids moving naturally through the microfractured formation. Suitable prepad fluids would retain high viscosities and/or tightly packed crystalline structures even at high temperatures to prevent or greatly limit fluid transmigration. The selection of prepad fluid in a particular disposal application would also be influenced by the foregoing considerations of mutual chemical compatibility, viscosity, the temperature and pressure downhole, etc.

It will be appreciated that as it is pumped into the formation the prepad fluid could tend to coat undesirably the tubing 100, described in more detail below in connection with FIGS. 8A and 8B. It might be possible to avoid that coating by controlling the adhesion properties of the prepad fluid, e.g., the prepad fluid could become adhesive when subjected to the temperature of the formation or as a result of time-delayed action of an additive. Prepad coating of the tubing can also be avoided by precoating the tubing with a suitable material that would repel the prepad fluid. The properties of such a precoating material would depend, of course, on the prepad fluid selected, and could include highly ionic materials, although other materials are also expected to be suitable.

In the foregoing description, three ways to isolate hazardous wastes have been described: (1) micro-encapsulation of solid waste particles; (2) use of a transport fluid that eventually obtains a very high viscosity or solidifies; and (3) use of prepad fluids that form a sealing layer at the face of the fracture. It will be appreciated that each method can be used separately or in combination with one or both of the other methods. It will also be appreciated that each method has distinct features that influence other aspects of the present embedment process. For example, it would typically be preferable to micro-encapsulate water-soluble solid waste rather than select a non-aqueous transport fluid since non-aqueous transport fluids would typically be more expensive. Downhole conditions also play a role in the selection of waste handling method. Since an object of the present invention is to isolate permanently the wastes underground, prepad fluid formation sealing could be done even for essentially impermeable formations, such as shales, to obviate completely any risk of leakage due to microfractures in such formations. Also, use of a transport fluid with an underground viscosity increase would also contribute to the same goal.

Surface Equipment

Suitable surface equipment would be provided to store, monitor, blend, and pump the prepad and transport fluids and wastes. As described further below, suitably modified conventional oilfield stimulation equipment can achieve these purposes. FIG. 1 illustrates a preferred configuration of surface equipment and its placement suitable for the present embedment process.

A disposal well surface apparatus 10 comprises a blender 20 that mixes the selected transport fluid drawn from one or more reservoirs 30 and a mixing manifold 40 with the waste drawn from one or more waste reservoirs 50 in an appropriate ratio at a pressure sufficient to move the mixture through low pressure hoses 60 to a distribution manifold 70 and one or more pumps 80. A conventional wellhead 90 is provided for controlling access to the well bore. It will be appreciated that although the reservoirs 30 may contain already mixed transport fluids like the polymer water gels described above, one or more reservoirs could contain concentrated polymer or other gelling agent and the others could contain water. Mixing of the concentrated gelling agent and water could then be carried out in the blender 20. If desired, a prepad fluid would first be drawn from a reservoir 35 to the blender 20 for lining the formation as described above. Each of the manifolds 40 and 70 is conveniently implemented by a pipe section to which suitable input and output connections are made; for the manifold 70, high pressure pipe and fittings are commercially available from WECO and National. The arrows in the Figure illustrate directions of fluid flow.

The blender 20 would typically be compatible with pump rates up to about 50 barrels per minute, and would advantageously be a commercially available trailer-mounted blender unit such as that described further below. The flow rate down hole would be determined by the conventional considerations of the strength of the formation and well boundaries (since higher flow rate would typically require higher pressure or a weaker formation) and turbulent/laminar flow. It will be understood that turbulent flow would be helpful in maintaining solid waste particles in suspension in the transport fluid, although frictional losses are greater for turbulent flow than for laminar flow and would thus require higher pump power.

Figure 4A:
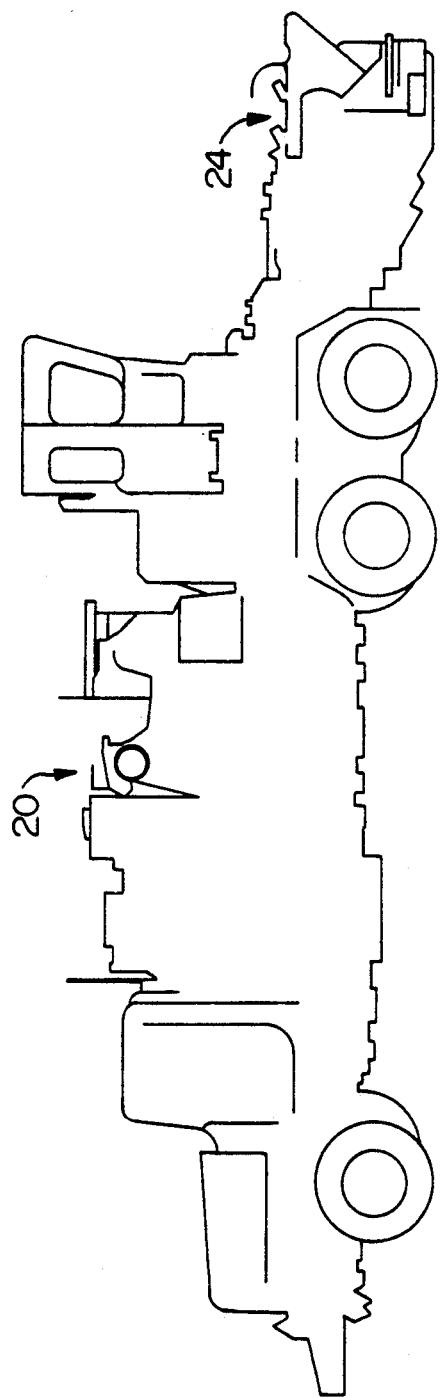
FIG. 4A is a schematic view of a truck-mounted blending unit.
Figure 4B:
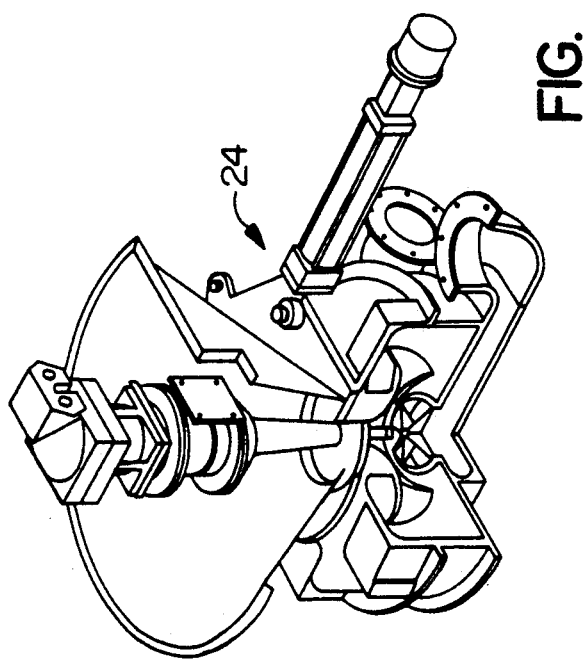
FIG. 4B is a partial cross-section of a vortex mixer provided on the truck-mounted blending unit.
Figure 4C:
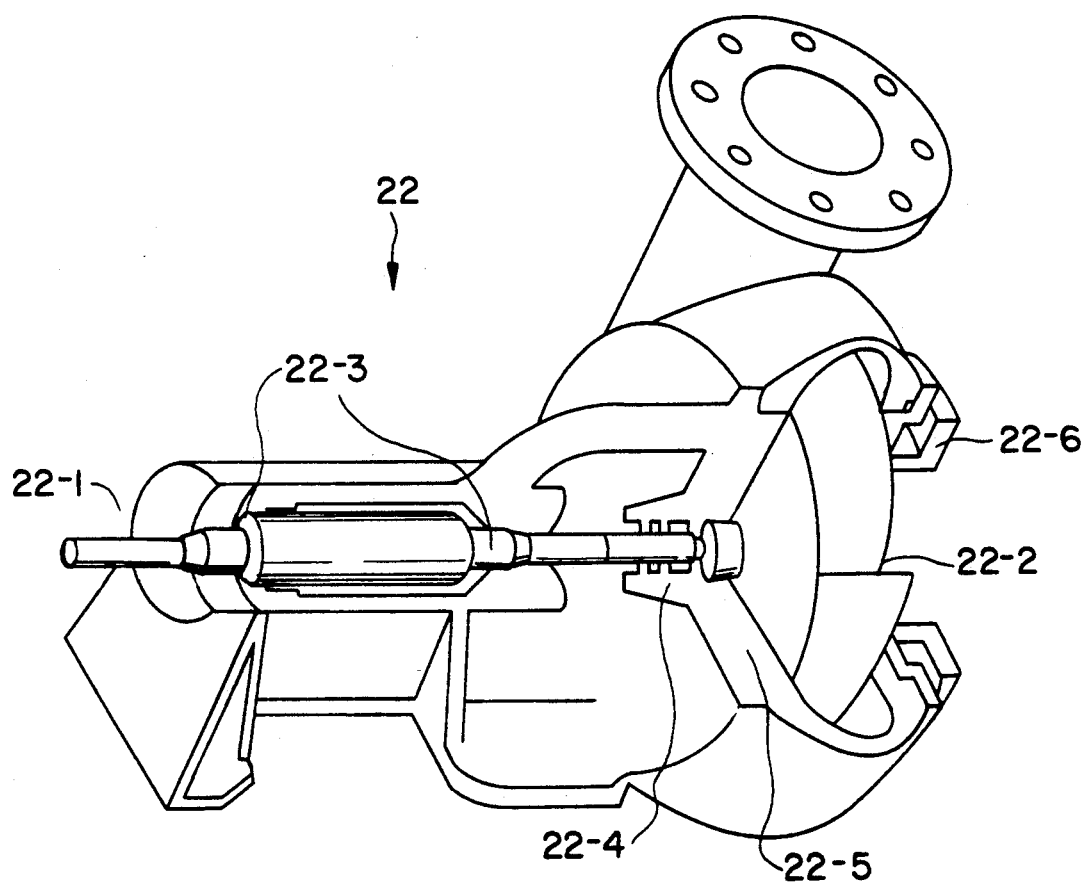
FIG. 4C is a cut-away view of an oilfield centrifugal pump.

Suitable blenders are manufactured by companies such as Dowell Schlumberger, B-J Titan, Halliburton, SPM, and Dyer, and are conventionally powered by 200 to 400 horsepower (hp) deck engines manufactured by, for example, Cummins Engine Company and Caterpillar. In the apparatus 10, the blender 20 (a conventional truck-mounted unit is illustrated in FIG. 4A) would draw fluids from the reservoirs 30, which may be conventional liquid storage trailers (illustrated in FIGS. 7A and 7B), by using a conventional oilfield centrifugal pump 22 (shown in FIG. 4C). Such a pump 22 comprises a heavy duty shaft 22-1 driving a semi-open impeller 22-2 and supported by heavy duty bearings 22-3, with replaceable stuffing box 22-4, wear plate 22-5, and suction cover 22-6.

A suitable blender 20 would also include a conventional vortex mixer 24 (illustrated in FIG. 4B) for mixing the fluids in precise quantities with the wastes and any special additives desired for the particular waste disposal application, such as thickening agents like hydroxypropel guar and cement, or crosslinkers like titanium and zirconium. The blender 20 would pressurize the mixed fluids, wastes, etc. to approximately 60 pounds per square inch (psi) in order to move the mixture through hoses or other suitable conduits to the pumps 80 (see FIG. 1 for direction of flow).

Figure 2:
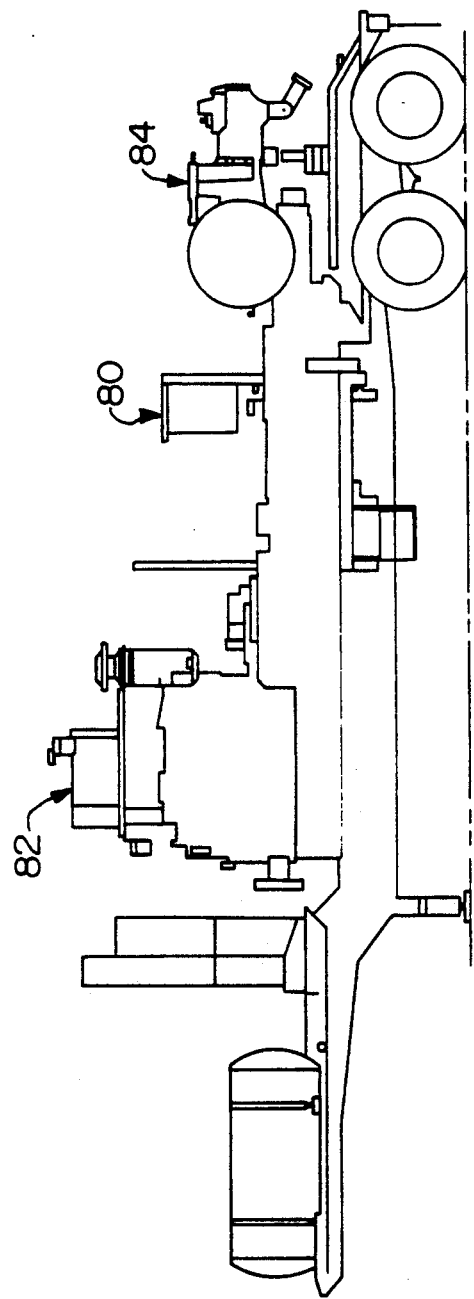
FIG. 2 is a schematic diagram of a trailer mounted pumping unit.
Figure 3A:
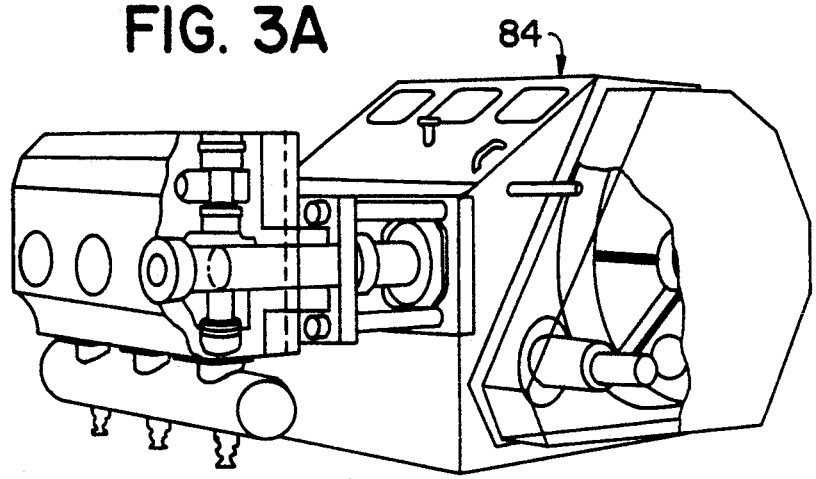
FIGS. 3A, 3B, and 3C are views of a triplex pump.
Figure 3B:
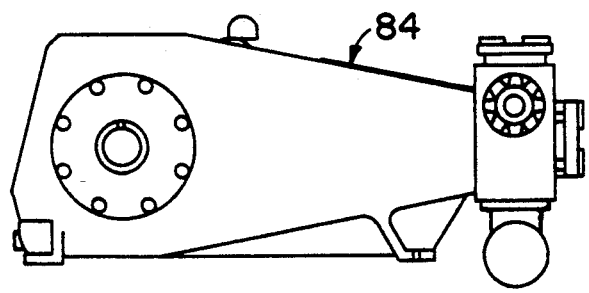
Figure 3C:
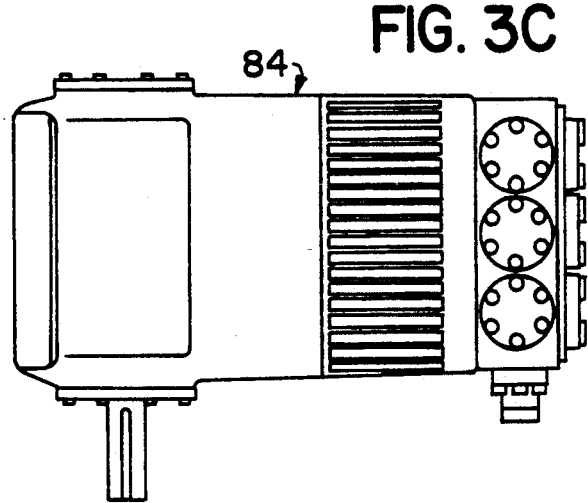

The pumps 80 (see FIG. 2), like the other surface equipment of apparatus 10, would advantageously be portable for easy movement between well sites, e.g., commercially available trailer-mounted pumping units. Such units are usually about 10 meters long, 2.5 meters wide, 3.5 meters high, and 23.5 tonnes in weight. The pumps 80 would raise the pressure of the transport fluid/waste mixture to a level sufficient to initiate and continue fracturing of the subterranean formation, e.g., 2,500 psi to 10,000 psi at flow rates as high as 22 barrels per minute. The heart of a conventional pump unit is its engine 82, which is typically a 400 to 850 hp unit manufactured by Cummins Engine Company or Caterpillar. The engine typically drives a conventional triplex pump 84 (see FIGS. 3A, 3B, and 3C), which is a three-piston gear-driven device about 6 feet long, 3 feet wide, and 2 feet high that is often used in oil and gas drilling operations. It will be understood that depending on the particular disposal application, more than one pump unit may be provided and their outputs manifolded together (see FIG. 1), thereby allowing their combined flow rates to be pumped to the well bore simultaneously.

Furthermore, it will be understood that the flow rates are typically determined by the amount of friction encountered in the formation and the flow regime that is chosen, i.e., turbulent or laminar flow. In situations where pressures greater than 10,000 psi are desired, e.g., to initiate or maintain fracturing of relatively stronger formations, pumps known as intensifiers that can produce pressures as high as 17,500 psi could be provided. Triplex pumps are commercially available from companies such as National, Mattco, Halliburton, and LTV. Complete pumping units are manufactured by Dowell Schlumberger, Halliburton, SPM, Dyer, and B-J Titan.

Monitoring instrumentation 85 that is typically provided in oilfield exploration and stimulation equipment would also advantageously be included in the apparatus 10. For example, a suitable densitometer would measure the amount of solids entrained in the transport fluid-waste mixture being pumped, and would typically provide visual readout in units such as pounds per gallon. An inline laminar rheology flow loop, such as that commercially available from Halliburton Resource Management Co., could be used to monitor continuously the viscosity of the mixture to ensure uniform consistency. It will be appreciated that the monitoring instrumentation assists in maintaining the desired consistency of the transport fluid-waste mixture and providing quality assurance during the embedment process.

Referring again to FIG. 1, the apparatus 10 also includes one or more types of storage vessels 50 to hold the different types of wastes on location at the well site. A very large commercially available solid waste storage vessel 52 is a trailer-mounted bulk system (see FIG. 5A) that can store as much as 450,000 pounds of material. The system 52 would transfer the waste to the blender 20 by means 53 of either a conveyor belt or a pneumatic system, i.e., an air stream. To meet government emission and safety requirements, a commercially available trailer bulk system would be modified for use in the apparatus 10 by suitably enclosing the system and adding suitable filters 54 and in-line blowers to generate a slightly below-atmospheric-pressure within the system; thus, the modified system 52 would operate without air emissions.

FIGS. 5B*a-c* and 5C*a-b* show other pneumatic storage vessels that could also be used for solid storage. The vessel 52' shown in three orthogonal views in FIGS. 5B*a-c* would have a capacity of about 620 cubic feet and include a cyclone dust collector 52-1' and separator 52-2'. The trailer-mounted vessel 52" shown in the side and rear views of FIG. 5C*a-b* would hold about 16 cubic meters and be about 25 feet long, 10 feet wide, and 13 feet high. Such vessels are commercially available from Hobbs Corp. or Tempte Trailer Works, Commerce City, Colo. One of the advantages of a pneumatic vessel is that the air flow could be reversed for shutdown, thereby minimizing emissions at the well site.

Figure 6A:
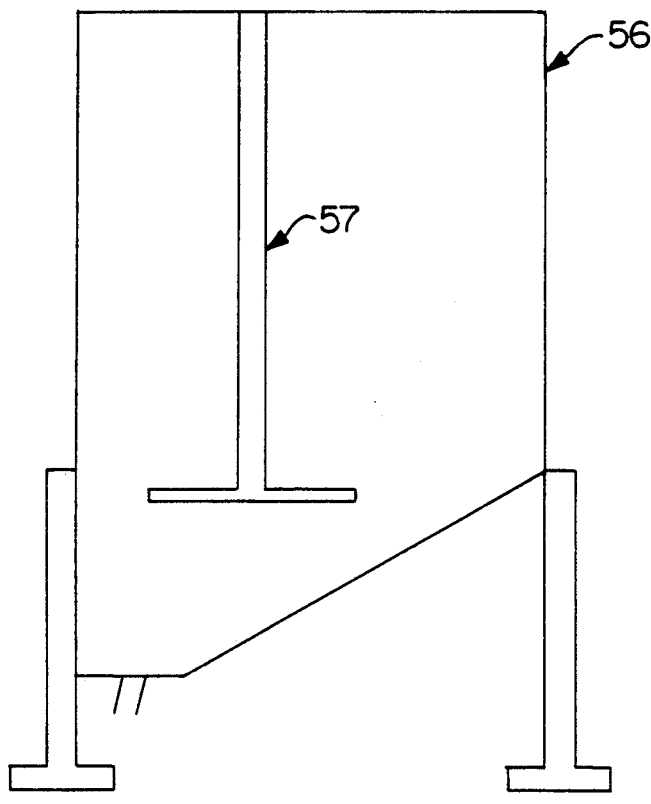
FIG. 6A is a schematic diagram of a vertical tapered storage bin.
Figure 6B:
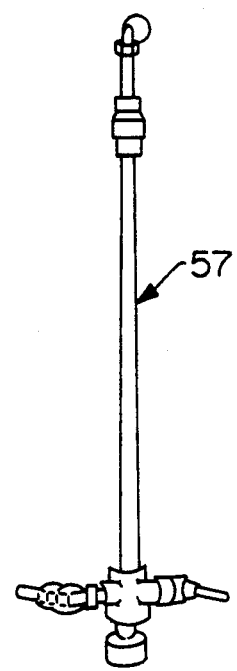
FIG. 6B is a detail of a spinner type agitation system for the vertical tapered storage bin.

Sludges would preferably be stored in elevated bins 56 (illustrated in FIG. 6A) that could, for example, hold approximately 350 barrels. Thus, gravity, as well as a slight suction generated by the blender 20, would move the sludges from the bin 56 to the blender through suitable hoses or conduits. Each elevated bin 56 might be 8 feet high by about 20 feet high, and would typically contain an agitation device 57, such as the spinner-type agitation device shown in FIG. 6B, that would be powered by either liquid or air, whichever fluid is appropriate for the type of sludge being stored. The agitation device would maintain a uniform consistency in the sludge tank and prevent bridging of the sludges.

Liquids would be stored, for example, in suitable 500-barrel storage tanks 54 having internal piping that could be trailer-mounted as shown from top and side views in FIGS. 7A and 7B, and moved as described above in respect to blender operation.

Well Drilling

Once a suitable site has been selected and prepared as described above, the disposal well will be drilled, preferably using a conventional oilfield rotary rig and proven oilfield technology. The well will be spudded and drilled from the surface to a depth at least several hundred feet below the deepest aquifer. As illustrated in FIGS. 8A and 8B, a surface casing pipe string 92 will be run into the hole until it reaches bottom. Cement would be circulated down the casing string 92 and forced out of the bottom of the string and up the annulus between the outside of the string 92 and the sides of the hole until cement reached the surface.

Once the cement 94 hardened, drilling would continue with a smaller drilling bit until the well reached the desired total depth ("T.D."), which would advantageously be as deep as 18,500 feet. A second, oil casing pipe string 96 would then be run from the surface to the T.D., and cement 98 would again be pumped down the casing string 96, up the annulus to the surface and allowed to harden. It will be appreciated that the cement layers 94 and 98 and pipe strings 92 and 96 preferably cooperate to line the entire length of the well, thereby isolating upper formations from the waste during and after embedment.

Based on the drilling logs and previous seismic exploration, a formation would be selected beginning at the bottom of the well bore into which the waste-transport fluid mixture would be pumped. It will be appreciated that the drilling logs commonly available in oil and gas exploration, e.g., mud, electrical resistivity, sonic measurements of density, neutron, gamma ray, and dip meter logs, are suitable. It will also be appreciated that drilling cores can be used to identify suitable strata for waste embedment, although at higher cost than drilling logs.

Communication between the formation and well bore will typically be established by selectively perforating, or notching, the casing 96 and cement 98. Perforations to expose about six feet of the selected formation can be created conventionally by lowering a device, such as a perforating gun, into the well bore by wireline to the selected depth. An electric charge sent from the surface to the gun would detonate explosive charges that would propel projectiles through the casing and cement, which would typically be 3 to 4 inches thick, into the formation to an extent of about 13 or 14 inches. Other perforation techniques normally used in oil and gas exploration, such as acid cutting and preslotting, can also be used where appropriate.

Once communication with the formation has been established, a third pipe string 100, known as tubing, would be run into the well bore. The tubing 100, which might have an inside diameter of 2 ⅜ inches, would stop at a depth just above the perforations and would be mechanically locked in place by a conventional packer 102. The stronger tubing 100 and packer 102 (typically about 10,000 psi strength) would isolate the weaker casing, (typically about 6,000 psi strength) from waste fluid pressure for fracturing the formation and transporting the waste during the embedment process. It will be appreciated that the diameter of the tubing is preferably sufficiently small to assure turbulent flow of the waste/transport fluid mixture, thereby aiding in maintaining solid waste in suspension. After installation of the tubing 100 and packer 102, waste disposal could begin.

Figure 8A:
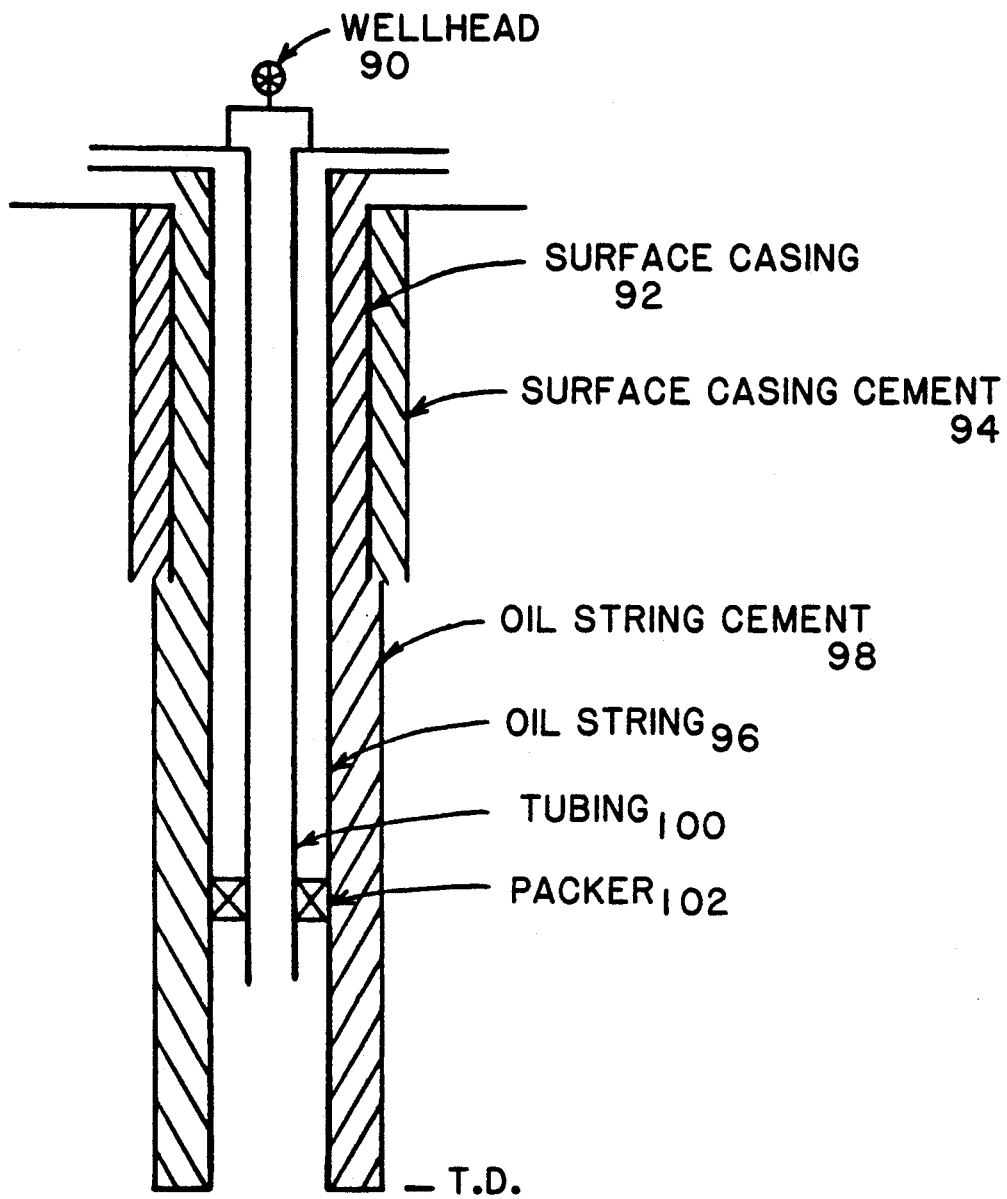
FIG. 8A is a cross-section of a vertical well.
Figure 8B:
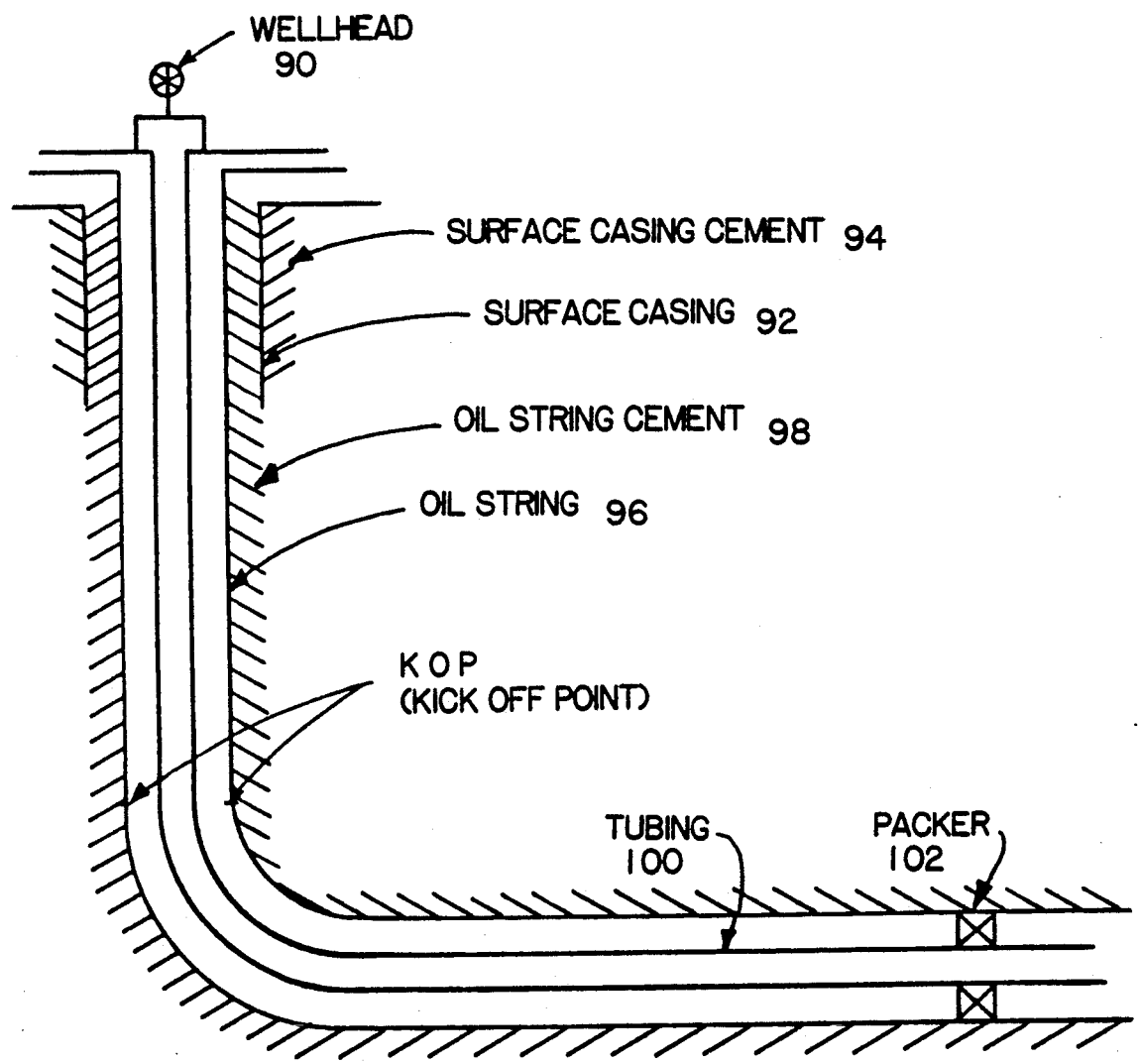
FIG. 8B is a cross-section of a horizontal well.

A somewhat more costly alternative to the vertical well shown in FIG. 8A would be a horizontal well illustrated in FIG. 8B. A horizontal well begins in much the same way as a vertical well. Once the surface casing 92 had been set, the horizontal well would be deepened in the same manner as a vertical well until the well reached a "kick off point" ("KOP"), which is the depth at which the drilling direction would begin deviating from vertical. The drilling direction's deviation from the vertical would increase until the drill bit was moving horizontally as it entered the selected formation. Today, a well can be drilled as much as 7,000 feet horizontally using conventional "medium radius" technology that primarily involves equipment built into or near the drill bit. During drilling, the location of the bit is monitored and controlled by a computer at the surface through gauges, and a small motor and stabilizers built into the drill pipe direct the drill bit on its horizontal path.

As described in more detail below, a horizontal well would permit multiple embedments within the same formation, and after the embedments in the horizontal section of the well, the embedment process could be continued uphole in appropriate formations or another horizontal segment could be drilled into a second formation. In addition, using horizontal wells can make the surface site more permanent, and by using a hub and spoke drilling pattern, the surface locations of the wellheads could be close together. It will be appreciated that the relative locations of multiple embedments from a single well or from several nearby wells would be selected to avoid interferences of the vertically lenticular fracture zones underground. Such selection would be guided by the fact that the mass of overburden at depths greater than about 2,000 feet is sufficient to cause the fractures to be vertical always because rock breaks in the direction perpendicular to the direction of least principal stress. Accordingly, a vertical separation of 500 feet between multiple embedments from a single well should provide adequate separation.

Waste Embedment

During the embedment process, the transport fluid-waste mixture having a viscosity of about 25 centipoise will be pumped from the surface down the tubing 100 until the tubing was full. The pumps 80 would apply pressure to the mixture, and since the mixture as described above would be substantially incompressible, the pressure applied at the surface would be exerted uniformly through the tubing and against the exposed face of the formation. The pressure would then be increased until the formation "parted" or fractured.

Figure 9:
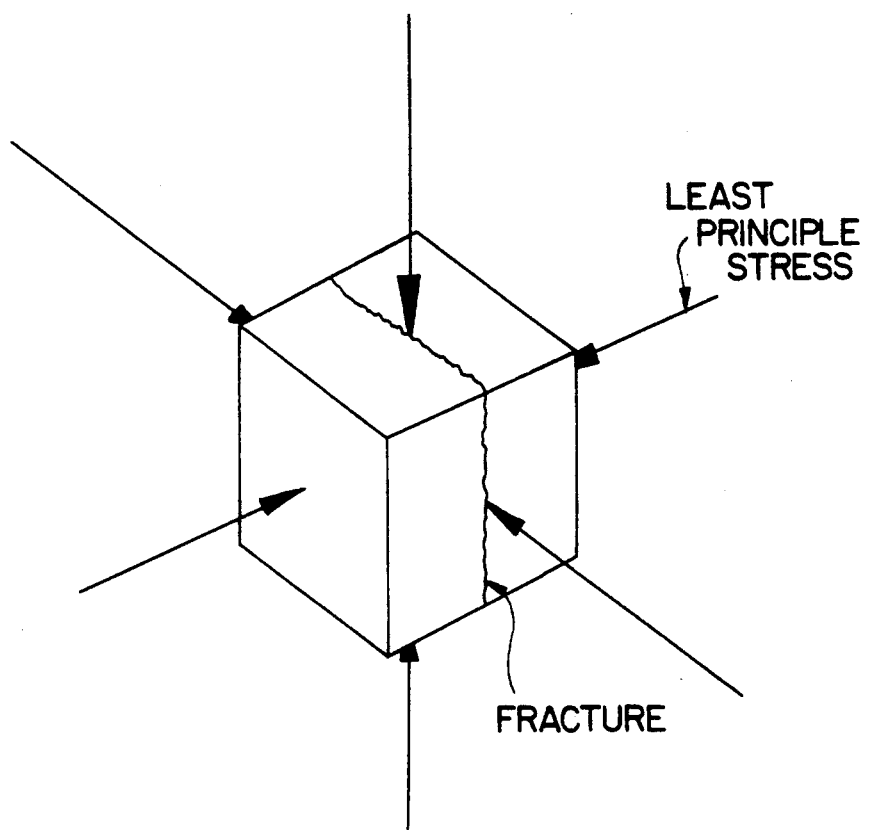
FIG. 9 illustrates the relative directions of stress and fracturing in a subterranean formation.

It will be appreciated by those of ordinary skill in the art that fracturing occurs in the direction perpendicular to the least principal stress in the formation as described above and illustrated in FIG. 9, and thus the fracturing will always be substantially vertical because, at the depth at which the waste would be embedded, the stress imposed by the weight of overburden would always be greater than the tensile strength of the formation.

Once the rock formation begins to fracture, the fluid/waste mixture will begin to penetrate the formation, applying pressure to the walls of the fractured area and reducing the stress concentration that would have previously existed in the vicinity of the well bore. Analysis of fracturing and stress concentration is often carried out with the aid of Mohr diagrams that represent shear and normal stresses and can be used to determine the combination that will induce formation failure, as described in "Reservoir Stimulation" by M. Icing Hulbert, Schlumberger Educational Services, 1987, which is incorporated herein by reference.

It will be appreciated that the fluid-waste mixture pressure that would be required to hold the fracture open, in the case of a non-penetrating fluid, is equal to the component of the undistorted stress field in a direction normal to the plane of the fracture. Application of greater pressures would extend the fracture into the formation until pressure transmission losses to the leading edge of the fracture and limits on the pressure available from the pumps 80 or the internal yield pressure of the tubing 100 combined to halt the fracturing.

Once the fracture was initiated, waste would be mixed with the transport fluid at the surface. It is conceivable that in excess of 3,000,000 pounds of waste could be placed in a single formation. The viscosity of the transport fluid/waste mixture, as well as the concentration of solids, will constantly be monitored by viscometers and densitometers as previously described in connection with the surface equipment. As described above, maintaining the mixture's viscosity at about 25 centipoise during its course through the tubing is advantageous in that it permits the use of pumps and tubing with reasonable performance specifications. Moreover, turbulent flow through the tubing would help maintain solid waste in suspension.

It will be appreciated that as the mixture entered the fracturing formation, the flow velocity would decrease from between several hundred to several thousand feet per minute to several tens of feet per minute because the pressure would partially dissipate as the rock cracked and formed fractures that might extend 500 feet vertically and 1500 feet horizontally. In the prior waste disposal processes employing cement, such as the above-described Stogner patent, such flow velocity reduction would permit solid waste to settle out at the bottom of the well bore rather than be carried into the formation. Using the time-delay viscosity increase provided in one aspect of the present method would avoid such problems because the viscosity of the waste/transport fluid mixture would have increased to about 60 centipoise by the time the mixture began to enter the formation, and further increasing to several hundred centipoise within moments thereafter. Such a viscosity increase would be sufficient to maintain solid waste in suspension in the face of the fluid velocity decrease.

As the formation nears filling, addition of the waste to the transport fluid will stop. Conventional tracers would advantageously be added to the transport fluid to clearly identify the top of the parted interval.

Finally, a dense cement would be pumped down the tubing, i.e., the well would be overflushed, to insure that there would be no communication with the surface through or near the well bore, and some of the dense cement would be allowed to remain in the well bore to provide a good seal against leakage back up the well bore. After the dense cement cured, the pump pressure would be released, the tubing 100 removed and the well surveyed to determine the height of the fracture top. A conventional bridge plug, which is a mechanically activated isolation tool, would be run down the well, further sealing the waste-loaded formation.

In accordance with one aspect of the present invention, waste embedment could then begin again in another suitable formation uphole, and the foregoing steps would be repeated until all suitable formations accessed by the well have been used. After the last such formation had been loaded and sealed, cement would be run into the string 96, filling it to the surface. Finally, a steel plate would be welded atop the surface casing. For economio, site security, and other reasons, it is preferred that a minimum of four well sites be available. Well sites would probably be based on typical forty-acre drill sites.

The foregoing description of the invention is intended to be in all senses illustrative, not restrictive. Modifications and refinements of the embodiments described will become apparent to those of ordinary skill in the art to which the present invention pertains, and those modifications and refinements that fall within the spirit and scope of the invention, as defined by the appended claims, are intended to be included therein.

What is claimed is:

1. A method of disposing of waste, comprising the steps of:
   (a) fracturing a substantially impermeable subterranean formation at a first depth by hydraulic pressure exerted through a well bore drilled into the formation;
   (b) selecting a polymeric transport fluid that is substantially incompressible, compatible with the waste to be disposed, and capable of undergoing a time-delayed increase in viscosity under subterranean conditions;
   (c) mixing the waste with the polymeric transport fluid to form a mixture having an initial viscosity low enough to permit the mixture to be pumped and high enough to maintain the waste in suspension under conditions of turbulent flow as the mixture is being pumped through a well bore and into a fractured subterranean formation;
   (d) pumping the mixture through a well bore into the subterranean formation, whereby the mixture undergoes an increase in viscosity sufficient to keep the waste in suspension as the flow velocity of the mixture decreases; and
   (e) relieving pressure on the mixture to permit the fractured formation to close around the mixture;
   whereby the mixture reaches a viscosity inside the subterranean formation sufficiently high to immobilize the mixture and prevent substantial migration of the waste.

2. The method according to claim 1, wherein fracturing of the subterranean formation is initiated by pumping the polymeric transport fluid into a well bore at a pressure sufficient to fracture the subterranean formation, and fracturing is continued by pumping the mixture of waste and polymeric transport fluid into the formation.

3. The method according to claim 1, wherein the subterranean formation is fractured by pumping the mixture of waste and polymeric transport fluid into a well bore at a pressure sufficient to fracture the subterranean formation.

4. The method according to claim 1, further comprising, after step (e), the step of fracturing the substantially impermeable subterranean formation at a second depth higher than the first depth by hydraulic pressure exerted through the well bore, and then repeating steps (d) and (e).

5. The method according to claim 1, wherein the waste is mixed with the polymeric transport fluid to form a mixture having a viscosity of about 25 centipoise, and the viscosity of the mixture reaches at least about 100 centipoise inside the subterranean formation.

6. The method according to claim 1, further comprising the steps of:
   coating the solid waste with a polymer before mixing it with the polymeric transport fluid; and
   injecting a prepad fluid into the fractured subterranean formation prior to pumping the mixture into the fractured formation.

7. The method according to claim 1, further comprising the initial step of drilling a well bore into a substantially impermeable subterranean formation.

8. The method according to claim 1 further comprising the step of injecting a prepad fluid into the fractured formation in order to seal the formation prior to pumping the mixture into the subterranean formation.

9. The method according to claim 1, wherein the waste is mixed with an aqueous solution of a polymer material selected from the group consisting of polyacrylamide, hydroxypropyl guar, hydroxyethyl cellulose, polycarbonate, and monomers thereof, and a cross-linking agent.

10. The method according to claim 9, wherein the waste is mixed with a highly positively charged ionic substance selected from the group consisting of titanium, zirconium, iron and aluminum, as a cross-linking agent.

11. The method according to claim 10, wherein the waste is mixed with guar.

12. The method according to claim 5, wherein a polymer material selected from the group consisting of polyethylene, polybutylene, modified polyesters and epoxies is injected into the fractured formation as a prepad fluid.

13. The method according to claim 1, wherein at least a portion of the waste to be disposed is solid waste having particle sizes ranging from 10 to 100 mesh.

14. The method according to claim 1, wherein at least a portion of the waste to be disposed is solid waste having particle sizes greater than 10 mesh, and the method further comprises the step of grinding the solid waste to obtain particle sizes ranging from 10 to 100 mesh prior to mixing the waste with the polymeric transport fluid.

15. The method according to claim 1, wherein at least a portion of the waste to be disposed is solid waste having particle sizes less than 100 mesh, and the method further comprises the step of agglomerating the solid waste to obtain particle sizes ranging from 10 to 100 mesh prior to mixing the waste with the polymeric transport fluid.

16. The method according to claim 1, wherein at least a portion of the waste to be disposed is solid waste, and the method further comprises the step of coating the solid waste with a polymer before mixing it with the polymeric transport fluid.

17. The method according to claim 16, wherein the solid waste is coated with a polymer selected from the group consisting of polycarbonates, modified polybutadienes, polyethylenes, isopolyesters and epoxies.

18. The method according to claim 1, wherein up to 12 pounds of waste per gallon of fluid are carried into the subterranean formation.

19. The method according to claim 1, wherein up to about 20 pounds of waste per gallon of transport fluid are carried into the subterranean formation.

20. The method according to any one of claims 1 or 4, wherein the formation is fractured at a depth of at least about 5,000 feet below the surface.

* * * * *

UNITED STATES PATENT AND TRADEMARK OFFICE
CERTIFICATE OF CORRECTION

PATENT NO. : 5,133,624

DATED : July 28, 1992

INVENTOR(S) : Calvin D. Cahill

It is certified that error appears in the above-identified patent and that said Letters Patent is hereby corrected as shown below:

Column 16, line 35 - insert after "Claim 1,"
-- wherein at least a portion of the waste to be disposed is
   solid waste --

Column 16, line 61 - insert after "mixed with"
-- hydroxylpropyl --

Column 16, line 62 - delete [claim 5] and insert therefor
-- claim 8 --

Signed and Sealed this

Eighth Day of February, 1994

Attest:

BRUCE LEHMAN

*Attesting Officer*        *Commissioner of Patents and Trademarks*